Aug. 20, 1963  R. F. POST  3,101,310
MAGNETIC END CLOSURES FOR PLASMA CONFINING AND HEATING DEVICES
Filed Feb. 1, 1962

INVENTOR.
RICHARD F. POST
BY
Roland A. Anderson
ATTORNEY.

3,101,310
MAGNETIC END CLOSURES FOR PLASMA CONFINING AND HEATING DEVICES
Richard F. Post, Walnut Creek, Calif., assignor to the United States of America as represented by the United States Atomic Energy Commission
Filed Feb. 1, 1962, Ser. No. 172,053
9 Claims. (Cl. 204—193.2)

The present invention relates generally to plasma confinement and heating devices, and more particularly, to multiple reflector field closures for employment therein.

The present application is a continuation-in-part of my copending application Serial No. 734,059, filed May 8, 1958, now abandoned which is in turn a continuation-in-part of my copending application Serial No. 443,447, filed July 14, 1954, and hereby incorporates by reference pertinent subject matter disclosed therein. Briefly, the invention disclosed in said latter copending application comprehends the employment of a magnetic containment system generally characterized as an axially symmetric magnetic field having spaced, gradientially-intensified reflector field regions providing a containment zone for charged particles in an evacuated space. Methods and means are disclosed therein for the injection, trapping, heating, compression, and containment of charged particles (plasma). An especially useful application of these operations relates to the heating of plasma to extremely high kinetic temperatures with a high frequency of collisions occurring between the plasma ions whereby the ions may undergo various nuclear reactions productive of radiation. The present invention is of generaly similar relevance and, in view of the pertinence to the especially valuable field of controlled fusion research, the term "Pyrotron" has been conceived to designate devices and processes of the character disclosed in the said copending and previous related copending applications as well as the present aplication. The term "Pyrotron" as thus employed indicates a device of the character described and which employs a containment or plasma heating zone defined by an axially symmetric field having spaced gradientially intensified reflector field regions therein.

In conventional Pyrotrons, a plasma, i.e., a tenuous system of highly-ionized atomic nuclei and the associated electrons of suitable isotopes of light elements (e.g., deuterium, tritium, or the like) is provided in the containment zone defined by the above-indicated magnetic field. The plasma particles are both radially and axially confined within the containment zone by virtue of the configuration of the magnetic containment field, as is disclosed in extensive detail in the previously referenced copending patent application. The confined particles are then adiabatically compressed within the containment zone, as by appropriate manipulation of the containment field, or otherwise operated upon in such a manner as to materially heat the particles or increase the particle energy and cause nuclear reactions to occur between the thus rapidly colliding particles.

In order for the particle heating and reactions to be conducted with optimum efficiency in Pyrotrons, as well as other classes of controlled fusion devices such as those employing the "pinch effect" as disclosed in an article by Richard F. Post, Reviews of Modern Physics, vol. 28, No. 3, pages 338–362, July 1956, it will be appreciated that losses of the enengetic colliding particles from the containment or heating zone of the device must be minimized to the maximum extent possible. In this connection, one of the principal sources of particle loss from the containment zone of Pyrotrons as well as linear pinch effect devices, and other open-ended devices, arises from direct longitudinal transport of the particles out of the ends of the containment region. In conventional linear pinch effect devices, end losses of particles are extensive in that such devices provide no effective means of longitudinal confinement of the plasma particles. Thus, a high density, and therefore highly transient, mode of operation is commonly employed in conventional linear pinch effect devices to facilitate plasma heating in a time that is short compared to the time required for end losses of particles to become excessive. In conventional Pyrotrons, on the other hand, end losses of particles are substantially less by virtue of the gradientially-intensified terminal reflector field regions employed in the conventional Pyrotron containment field configuration. The majority of the plasma particles approaching 90% confined in a Pyrotron containment zone may be reflected from the reflector field regions by appropriately increasing their magnetic intensity with respect to time as described in the basic Pyrotron patent application, Serial No. 443,447. Still, a remaining small portion of the charged particles penetrate the reflector field regions and escape longitudinally from the containment zone. The foregoing arises from the attendant loss cone of gradientially-intensified reflector fields. More particularly, those particles within the containment zone having too high a ratio of translational to rotational energy relative to the gradient of the reflector field regions will escape therethrough.

It is therefore apparent that substantial advantage is to be gained by the employement of improved end closures in Pyrotrons, linear pinch effect devices, and other open-ended controlled fusion devices, to substantially eliminate charged particle end losses from the magnetic containment or heating zones thereof. The present invention provides a multiple magnetic field end closure region which is substantially impervious to charged particles moving axially thereof and hence facilitates improved containment of charged particles in Pyrotrons, and other classes of controlled fusion devices, resulting in a more efficient operation of same. In addition to the more effective containment obtained, the principles of the invention may be used to effect continuous injection of plasma into the static field of a Pyrotron undergoing continuous operation.

It is therefore an object of the present invention to provide an improved magnetic field end closure for employment in Pyrotrons and other classes of controlled fusion devices.

Another object of the invention is the provision of a magnetic field region which is substantialy impervious to charged particles moving axially therethrough.

It is still another object of this invention to provide a Pyrotron magnetic containment zone defined by an axially symmetric magnetic field having a plurality of axially spaced nodal reflector field regions terminally bounding a central field region of lesser magnetic intensity wherein the flow of charged particles is preferentially inwardly to the central field region.

A further object of the present invention is to provide means for continuously injecting charged particles into a static Pyrotron magnetic containment field configuration.

A still further object of the invention is the provision of means for generating a multiple reflector field end closure region for employment in open-ended magnetic containment and plasma heating devices.

The invention, both as to its organization and method of operation, together with further objects and advantages thereof, will best be understood by reference to the following specification taken in conjunction with the accompanying drawings, of which:

Figure 1:
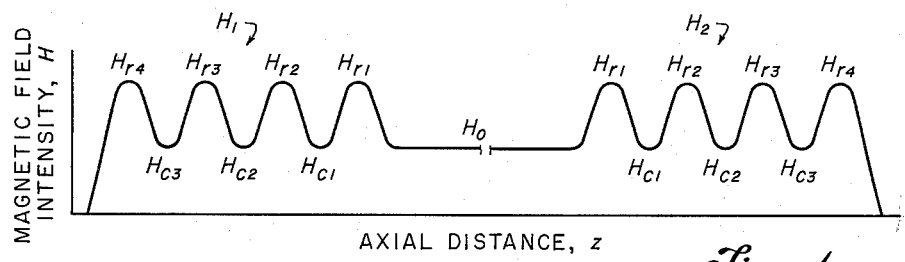
FIGURE 1 is a graphical presentation of an axial magnetic intensity profile of the multiple reflector field end closure region of the present invention as employed in an open-ended charged particle magnetic containment field.
Figure 2:
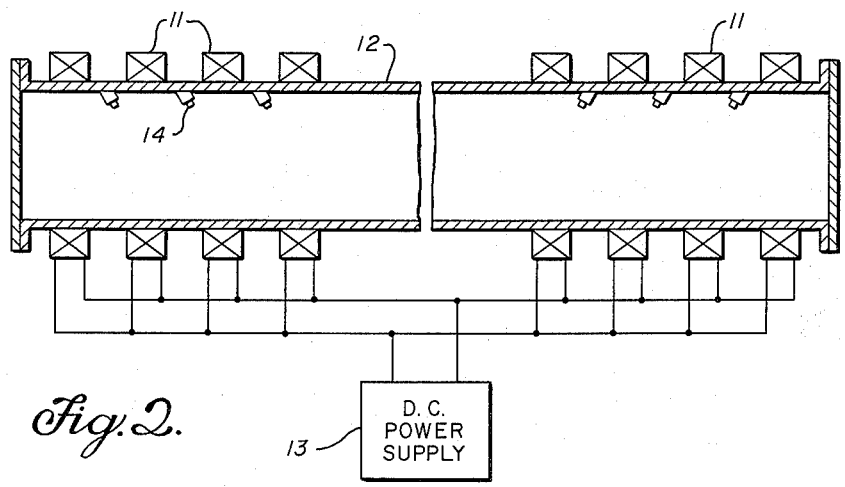
FIGURE 2 is a sectional view partially in schematic of a preferred structural embodiment of the invention for generating the magnetic end closure field of FIGURE 1.

Considering now the invention in some detail and referring to the illustrated forms thereof in the drawing with particular reference to FIGURES 1 and 2, there is provided generally solenoid means for generating an axially symmetric magnetic field having a plurality of axially spaced nodal reflector field regions, $H_r$, and thereby defining improved end closure field regions $H_1$, $H_2$ bounding a less intense central field containment or reaction region of intensity, $H_0$, of a Pyrotron, linear pinch effect, or other class of open-ended controlled fusion device. Thus, the present invention provides end closure regions in which the multiple reflector field regions, $H_r$, are in effect a succession of magnetic barriers defining a plurality of charged particle trapping cells, $H_c$, interposed therebetween.

Various structural arrangements are possible for the end closure field generating means of the present invention, and in this connection several alternatives are described hereinafter. For example, as illustrated in FIGURE 2, the field generating means of the present invention may comprise a plurality of coaxially spaced solenoids 11 peripherally disposed about the vacuum tank 12 of a charged particle containment device, e.g., a Pyrotron, linear pinch effect device, or the like. The spaced solenoids 11 are preferably disposed about the end regions of vacuum tank 12 adjacent the reaction region, $H_0$, established therein, for example in a Pyrotron, as by means of a centrally disposed containment field solenoid (not shown). The solenoids 11 are preferably identical in size and distribution of turns and the turns distribution may be made uniform over the length of each solenoid, or in some instances the number of turns may be made to increase from both ends toward the center of each solenoid to facilitate appropriate shaping of the magnetic field which is generated upon energization of same. Since the intensity of the axially symmetric magnetic field generated by a solenoid varies in the axial direction according to the expression:

$$H_2 = \frac{2\pi N I a^2}{(a^2 + Z^2)^{3/2}}$$

where $N$ = number of turns
$I$ = energizing current
$a$ = radial distance
$Z$ = axial distance the magnetic field intensity is greatest at the center of each solenoid 11 and rapidly decreases axially on either side of the center thereof. Moreover, it is to be noted that the field intensity varies directly with the number of turns, N, and the energizing current, I. Accordingly, with all solenoids 11 being identical as to number and distribution of turns as previously described, and spaced apart axially by sufficient amounts, the solenoids may be parallel connected to a D.C. power supply 13 to generate the multiple reflector field closures $H_1$, $H_2$ indicated in FIGURE 1 of the drawing. The peaks of the reflector field regions, $H_r$, coincide with the centers of solenoids 11 and the cell regions, $H_c$, coincide with the spaces therebetween. It will be appreciated that solenoids 11 may alternatively be separately energized by a plurality of identical current power supplies or energized in series by a single power supply 13 to also generate the multiple reflector field closures of the present invention.

As regards the axial spacing between adjacent solenoids 11, it is particularly noted that the exact spacing employed is preferably selected such that the length of each trapping cell, $H_c$, between successive reflector field regions, $H_r$, is equal to at least the mean free path for interparticle collisions of the plasma ions (e.g., deuterons), and preferably substantially equal thereto, at the particular particle density and energy of plasma ions within the respective cells. In order that the spacing between solenoids 11 may be practicably short for purposes of minimizing the overall length of the device in which employed, the mean free path for interparticle collisions within cells, $H_c$, may be made relatively short by the introduction of additional ions and space charge neutralizing electrons (i.e., a plasma) thereto in sufficient quantities and at appropriate energies to produce a resultant particle density and energy with the cells commensurate with a mean free path substantially equal to a predetermined relatively short cell length. To facilitate the foregoing, plasma sources 14 (e.g., of a type disclosed in U.S. Patent No. 2,764,707 to Crawford et al.) are preferably disposed within vacuum tank 12 at positions between the solenoids 11 to inject plasma into cells, $H_c$, between reflector field regions, $H_r$. Such injection of plasma is accomplished in a manner which is conventional in Pyrotron injection practice as disclosed in the previously referenced copending basic Pyrotron patent application. For example, the plasma sources may be disposed off axis and inclined at an angle thereto.

Considering now the operation of the multiple reflector field closures, $H_1$, $H_2$, of the present invention in minimizing particle losses from the central confinement region, $H_0$, of a controlled fusion device, it is to be noted that particles traversing helical paths centered about magnetic lines of force in the conventional manner in the region, $H_0$, and having too large an axial component of energy relative to its component of rotational energy may escape through the first reflector field regions, $H_{r1}$, in a manner which follows from particle losses through the single reflection field regions of conventional Pyrotron containment field geometries. In this connection reference may be had to the hereinbefore mentioned basic application for a Pyrotron which discloses the pertinent conditions which determine whether a charged particle will be reflected from a reflector field region or will penetrate same. In the improved end closure regions $H_1$, $H_2$, of the present invention, however, particles penetrating reflector field regions, $H_{r1}$, enter the first trapping cells, $H_{c1}$, and with a high degree of probability, suffer interparticle collisions therein which alter the ratio of axial to rotational energy thereof. Such probability of collision is high by virtue of the adjustment of the cell length relative to mean free path as previously described, i.e., by appropriate spacing of solenoids 11 and/or injection of additional plasma into the cells from ion sources 14. The ratio of the energy components of a colliding particle may be changed in a favorable manner (i.e., the ratio may be sufficiently decreased) such that the particle will be reflected from the second reflector field region, $H_{r2}$, to be then reflected alternately back and forth within cell, $H_{c1}$, between reflector field regions $H_{r1}$, $H_{r2}$ for a relatively long period of time. The particle eventually suffers a collision, or collisions, which reduce the ratio of rotational to axial energy by an amount sufficient for the particle to penetrate one of the reflector field regions $H_{r1}$, $H_{r2}$. With the reflector field regions, $H_r$, being of equal intensity, there is a 50% probability that the particle will penetrate reflector field region, $H_{r1}$, and thus be returned to reaction region, $H_0$, wherein there is a high probability that the particle will suffer a favorable collision and be trapped therein. Similarly, there is a 50% probability that the particle will penetrate reflector field region, $H_{r2}$, and enter the second trapping cell, $H_{c2}$, wherein the particle behavior is similar to that just described with respect to cell, $H_{c1}$.

It will be appreciated that particles may also penetrate the second reflector field region, $H_{r2}$, by reason of circumstances other than those set forth above. For example, a particle may penetrate the first reflector field region, $H_{r1}$, and not suffer a favorable collision within the first cell, $H_{c1}$. Inasmuch as the ratio of rotational to axial energy is unchanged, the particle then penetrates the second reflector field region, $H_{r2}$. Upon entering the second cell, $H_{c2}$, however, there is a high probability that the particle will suffer a favorable collision and be trapped therein for an appreciable period of time just as a portion of the particles entering cell $H_{c1}$ undergo favorable collisions and are trapped therein. Thus, the probability that particles escaping axially from the reaction zone, $H_0$, through the first reflector field regions, $H_{r1}$, will penetrate the remaining multiple reflector field regions, $H_r$, and thus escape from the closures $H_1$, $H_2$, rapidly decreases in an exponential manner as the number of such reflector field regions is increased. Moreover, the probability that particles escaping through the first reflector field region, $H_{r1}$, will eventually be returned to the reaction field region, $H_0$, similarly rapidly increases as the number of the reflector field regions, $H_r$, is increased. Therefore, the multiple reflector field end closure regions $H_1$, $H_2$, of the present invention provide an extremely effective means for substantially eliminating end losses of particles from the central containment zone of Pyrotrons and other open-ended plasma containment devices.

Figure 4:
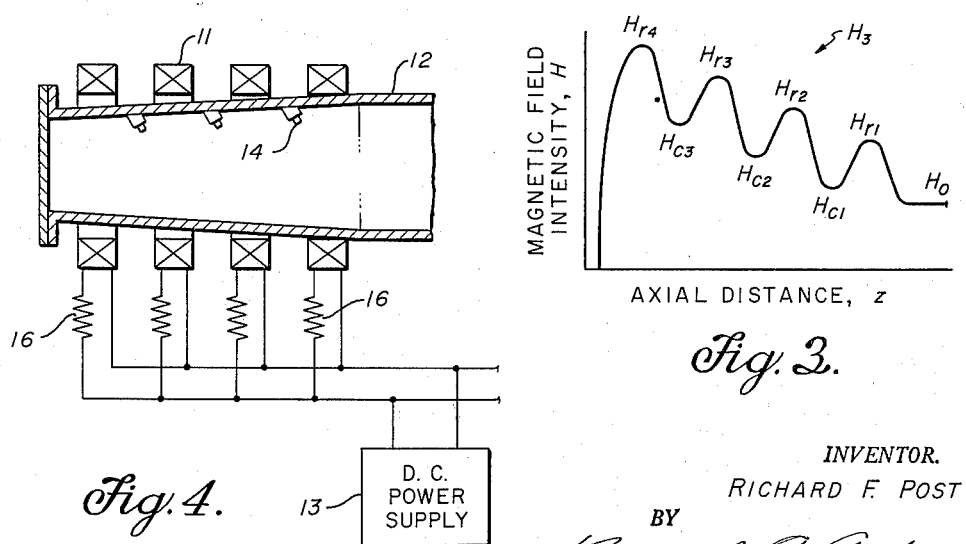
FIGURE 4 is a sectional view partially in schematic of the embodiment of FIGURE 2 as modified to generate the end closure field of FIGURE 3.
Figure 3:
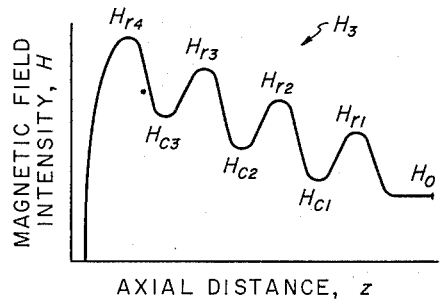
FIGURE 3 is a graphical illustration of an axial magnetic intensity profile of an alternate multiple reflector field end region for optimum containment of charged particles.

The probability of particle escape through the reflector field end closure regions of the present invention may be minimized by modifying such closure regions in the manner depicted in FIGURE 3. As shown therein, there is provided an alternate end closure region, $H_3$, in accordance with the present invention, having a plurality of spaced reflector field regions, $H_R$, of which the peak intensity and the intensity of the cell regions, $H_c$, interposed therebetween decrease decrementally in the direction of the reaction or containment field region, $H_0$. The closure region, $H_3$, may be provided by the field generating means illustrated in FIGURE 2, but modified such that the energizing currents applied to solenoids 11 increase in outward succession away from the reaction region, $H_0$. More particularly, D.C. source 13 may be, for example, connected in parallel to solenoids 11 through a corresponding plurality of resistors 16 as shown in FIGURE 4. The resistance values of resistors 16 connected to solenoids 11 in outward succession are respectively decreasing in decrements whereby the energizing currents through the solenoids in outward succession are decrementally increasing. Energization of solenoids 11 as described above accordingly produces the closure region, $H_3$, wherein the peak intensity of the reflector field regions, $H_R$, and cell regions, $H_c$, decrease decrementally in the direction of the reaction zone, $H_0$. The end closure region, $H_3$, may also be produced by connecting a plurality of D.C. power supplies having output currents which increase in decrements to solenoids 11 in outward succession. Alternatively, the number of turns on the solenoids 11 may be made decrementally greater for outwardly successive ones thereof and the solenoids energized all with the same magnitude current. Since the end closure region, $H_3$, produced by any one of the foregoing means includes reflector field regions, $H_R$, and cells, $H_c$, of increasing intensity in the outward direction, the particle containment volume enclosed by the field closure is radially decreasing in the outward direction. Accordingly, for purposes of material economy and the like, it is preferable that the end regions of vacuum tank 12 enclosed by solenoids 11 be tapered in the axially outward directions as illustrated in FIGURE 4.

By the nature of the mechanism involved as previously described, particle densities will be greatest in the reaction zone, $H_0$, and decreasingly less in successively outward ones of the cells, $H_c$, of the closure region, $H_3$, generated as described above. Moreover, particle diffusion from the cells will be preferentially in the direction of the lesser intensity reflector field peak adjoining the cells. There is a much higher probability that a particle trapped in one of the cells, $H_c$, will penetrate the lesser intensity one of the two reflector field peaks, $H_R$, adjoining the cell since the maximum ratio of rotational to axial energy at which a particle is capable of penetrating a reflector field varies inversely with the peak intensity thereof. It is therefore more probable that a particle trapped within, for example, the first cell, $H_{c1}$, will initially or eventually possess a ratio of rotational to axial energy which while being sufficiently small to penetrate the lesser intensity reflector field, $H_{R1}$, is still not small enough to penetrate the higher intensity reflector field, $H_{R2}$. Therefore, the particle preferentially diffuses in the direction of the lesser intensity peak, $H_{R1}$, toward the reaction region, $H_0$. The probability that a particle escaping axially from the reaction region, $H_0$, will penetrate all of the decremental reflector field regions, $H_R$, to thereby escape axially through the field closure region, $H_3$, is optimally small.

The multiple decremental field closure region, $H_3$, described above may also advantageously be employed to facilitate the injection of plasma into the containment region, $H_0$, of various controlled fusion devices. The plasma sources 14 which are employed to adjust the mean free path for interparticle collisions within the cell regions, $H_c$, as previously described also accomplish continuous injection of fuel particles or plasma into the reaction region, $H_0$. More particularly, substantially all particles injected into the cells, $H_c$, eventually progress by preferential diffusion from the higher intensity outer cell regions to the successively lower intensity inner cell regions and lowermost intensity reaction region by virtue of the probability mechanism hereinbefore described. The present invention thus results in the continuous accumulation of charged particles or plasma in the reaction region, $H_0$. It will be appreciated that the end closure regions $H_1$, $H_2$, illustrated in FIGURE 1 and hereinbefore described, may be similarly employed to accomplish continuous injection of plasma into the reaction region, $H_0$, but with a lesser efficiency since the diffusion probability from each cell region, $H_{c1}$, is equal in both axial directions therefrom.

It will be appreciated that the specific parameters of the multiple field closures of the present invention depend upon the parameters of the particular controlled fusion device sought to be improved. Hence, the parameters pertaining to the multiple field closures may be many valued depending upon the specific environment in which employed. However, typical parameters which may be employed in several specific cases are presented in the following examples.

*Example I*

In an embodiment according to FIGURES 1 and 2 with deuterium plasma, for example, confined in region $H_0$ without source 14, operating parameters were as follows:

| | |
|---|---:|
| Diameter of vacuum envelope 12_____cm__ | 25 |
| Intensity of central field region $H_0$ _____gauss__ | 10,000 |
| Length of field region $H_0$_____cm__ | ≅10 |
| Plasma density in region $H_0$ particles per cc__ | $10^{15}$ |
| Plasma ion temperature in region $H_0$___e.v__ | 100 |
| Plasma electron temperature in region $H_0$ e.v__ | 100 |
| Intensity of reflector regions $H_{r1, r2, r3, r4}$ _____gauss__ | 20,000 |
| Minimum intensity of cell regions $H_{c1, c2, c3}$ _____gauss__ | 10,000 |

Approximate plasma density distribution in trapping cells:

| | | |
|---|---|---|
| $H_{c1}$ | particles per cc | $3 \times 10^{14}$ |
| $H_{c2}$ | do | $10^{14}$ |
| $H_{c3}$ | do | $3 \times 10^{13}$ |

Length of trapping cells (greater than mean free path):

| | | |
|---|---|---|
| $H_{c1}$ | cm | $\approx 25$ |
| $H_{c2}$ | cm | $\approx 75$ |
| $H_{c3}$ | cm | $\approx 200$ |
| Resultant plasma confinement time | sec | $\approx 50 \times 10^{-6}$ |
| Plasma confinement time without multiple reflector fields (viz., with only reflector fields $H_{r1}$) | sec | $\approx 1.5 \times 10^{-6}$ |

*Example II*

The specific embodiment of Example I was modified to include plasma sources 14 to the end of obtaining the same confinement time with multiple reflector field closures of shorter length. Parameters productive of the desired results were as follows:

Type of plasma sources (in accordance with U.S. Patent No. 2,764,707)

Source output:

| | | |
|---|---|---|
| Mean plasma energy | e.v. | $\approx 150$ |
| Plasma yield per pulse | particles per cc | $\approx 5 \times 10^{17}$ |
| Number of sources per trapping cell | | 15 |

Resultant plasma density in each cell ___particles per cc___ $\approx 10^{15}$

Resultant length of trapping cells:

| | | |
|---|---|---|
| $H_{c1}$ | cm | $\approx 25$ |
| $H_{c2}$ | cm | $\approx 25$ |
| $H_{c3}$ | cm | $\approx 25$ |

*Example III*

The specific embodiment of Example II was modified to include reflector fields of increasing intensity in the manner illustrated in FIGURE 3. Parameters were as follows:

| | | |
|---|---|---|
| Intensity of central field region $H_0$ | gauss | $\approx 10,000$ |

Intensity of reflector field regions:

| | | |
|---|---|---|
| $H_{r1}$ | do | $\approx 1.1 \times 10^4$ |
| $H_{r2}$ | do | $\approx 1.2 \times 10^4$ |
| $H_{r3}$ | do | $\approx 1.4 \times 10^4$ |
| $H_{r4}$ | do | $\approx 2.0 \times 10^4$ |

Minimum intensity of cell regions:

| | | |
|---|---|---|
| $H_{c1}$ | do | $\approx 1.05 \times 10^4$ |
| $H_{c2}$ | do | $\approx 1.1 \times 10^4$ |
| $H_{c3}$ | do | $\approx 1.2 \times 10^4$ |
| Length of cell regions $H_{c1}$, $H_{c2}$, $H_{c3}$ | cm | $\approx 25$ |
| Resultant confinement time | sec | $\approx 250 \times 10^{-6}$ |

While the invention has been disclosed with respect to but several preferred embodiments, it will be apparent to those skilled in the art that numerous variations and modifications may be made within the spirit and scope of the invention, and thus it is not intended to limit the invention except as defined in the following claims.

What is claimed is:

1. In an open-ended device for the magnetic confinement and heating of plasma to high kinetic temperatures and having at least means for establishing in an evacuated space a reaction zone defined by a magnetic confinement field region for nuclear reactions between the constituents of gaseous plasma therein, the improvement comprising means including a plurality of solenoids spaced in generally coaxial parallel alignment and disposed in each of the opposite end regions of said reaction zone for generating therein an axially symmetric magnetic field having a plurality of axially spaced nodal reflector field regions of increased magnetic intensity terminally bounding said reaction zone and defining a plurality of charged particle trapping cells of lesser intensity interposed between said reflector field regions, said solenoids being spaced so that the nodal fields generated thereby are successively spaced to be at least about the mean free path distance of interparticle collisions in said charged particle trapping cells whereby the probability that particles escaping axially from the reaction zone through the innermost reflector field regions will successively penetrate all of said reflector field regions is low, and more effective confinement of the plasma is attained.

2. Means for providing magnetic end closure regions for minimizing axial losses of plasma constituent particles from the central magnetic field defined reaction region of an open-ended device for conducting nuclear reactions productive of radiation by the magnetic kinetic heating and confinement of plasma comprising means including a plurality of solenoids spaced in generally coaxial parallel alignment and disposed adjacent each of the opposite ends of said reaction region for generating an axially symmetric magnetic field terminally communicating with said reaction region and having a plurality of axially spaced gradientially-intensified reflector field regions defining a plurality of lesser intensity charged particle trapping cell regions interposed therebetween, said solenoids being spaced so that the spacing of said reflector field regions define cell regions having an axial length equal to at least the mean free path for interparticle collisions of said plasma constituent particles.

3. Means as defined by claim 2 but wherein said reflector field regions and said cell regions decrease decrementally in intensity in the direction of said reaction region.

4. Means for establishing magnetic end closure regions for minimizing axial losses of plasma constituent particles from the central magnetic field defined containment region of an open-ended plasma heating and containment device comprising means including a plurality of solenoids spaced in generally coaxial parallel alignment and disposed adjacent each of the opposite ends of said containment region for generating an axially symmetric magnetic field terminally bounding said containment region and having a plurality of axially spaced nodal reflector field regions of increased magnetic intensity defining a plurality of lesser intensity charged particle trapping cell regions interposed therebetween, said solenoids being spaced so that the nodal fields generated thereby are spaced to be at least the mean free path distance of interparticle collisions in said cell regions, and plasma source means communicating with said cell regions for injecting plasma particles thereinto in a quantity and with energies to establish within said cell regions a mean free path for interparticle collisions substantially equal to the axial length of said cells.

5. Means for establishing magnetic end closure regions for minimizing axial losses of charged particles from a device having an elongated linear magnetic field defining a central charged particle containment zone comprising means including a plurality of solenoids spaced in generally coaxial parallel alignment and disposed adjacent each of the opposite ends of said containment device for generating an axially symmetric magnetic field having a central region adjacent said zone and having a plurality of axially spaced nodal reflector field regions of outwardly successive incrementally increasing intensity extending axially outward from the central region and defining a plurality of outwardly successive incrementally increasing lesser intensity cell regions interposed between the reflector field regions, said solenoids being spaced so that said reflector field regions generated thereby are spaced to be at least the mean free path distance of interparticle collisions in said cell regions, and plasma source means communicating with said cell regions for injecting charged particles thereinto in a quantity and with energies commensurate with a mean free path for interparticle collisions of at most the axial length of said cells.

6. In an open-ended device for the confinement and heating of plasma to high kinetic temperatures including at least an axially elongated evacuated vacuum tank having a central magnetic field defined reaction region established therein containing gaseous plasma, the combination comprising a plurality of axially spaced-apart solenoids coaxially disposed about each end region of said vacuum tank to generate upon energization an axially symmetric magnetic end closure field having a plurality of gradientially-intensified reflector field regions with peaks coinciding with the centers of said solenoids and a plurality of lesser intensity cell regions extending therebetween, said solenoids being spaced by an amount to establish a cell length equal to at least the mean free path for interparticle collisions within said plasma, and D.C. power supply means connected to said solenoids for supplying energizing current thereto.

7. In an open-ended device for the confinement and heating of plasma to high kinetic temperatures as defined by claim 6, the combination further defined by said power supply means supplying energizing currents of incrementally increasing magnitudes to outwardly successive ones of said solenoids.

8. In an open-ended device for the confinement and heating of plasma to high kinetic temperatures including at least an axially elongated evacuated vacuum tank having a central magnetic field defined reaction region established therein and containing plasma constituent particles, the combination comprising a plurality of axially spaced-apart solenoids coaxially disposed about each end region of said vacuum tank, D.C. power supply means connected to said solenoids to supply energizing current thereto and thereby establish axially symmetric magnetic closure fields in the end regions of said vacuum tank, each closure field having a plurality of nodal reflector field regions of increased intensity coinciding with the centers of said solenoids and a plurality of cell regions of lesser intensity interposed therebetween, said solenoids being spaced apart by a distance substantially equivalent to the means free path of interparticle collisions in said cell regions, and a plurality of plasma particle sources communicating with the interior of said vacuum tank in the regions between said solenoids for injecting plasma particles into said cell regions to establish particle densities and energies therein commensurate with a mean free path for interparticle collisions substantially equal to the length of said cells.

9. In a plasma injector for an open-ended device for the confinement and heating of plasma to high kinetic temperatures including at least an axially elongated evacuated vacuum tank having a central magnetic field defined reaction region established therein for containing and heating gaseous plasma, the combination comprising outwardly tapered vacuum tank extensions formed at the opposite ends of the vacuum tank, a plurality of axially spaced-apart solenoids coaxially disposed about each of said extensions, D.C. power supply means connected to said solenoids for supplying energizing currents of incrementally increasing magnitudes to outwardly successive ones of said solenoids to thereby generate axially symmetric magnetic closure fields terminally bounding said reaction region, each closure field having a plurality of axially spaced nodal reflector field regions of outwardly successive incrementally increasing intensity defining a plurality of outwardly successive incrementally increasing lesser intensity cell regions interposed therebetween, said solenoids being spaced apart by a distance substantially equivalent to the mean free path of interparticle collisions in said cell regions, and plasma sources communicating with the interior of said extensions in the regions between said solenoids for injecting plasma into said cell regions, said plasma diffusing preferentially in the direction of lesser intensity magnetic field inwardly to said reaction region.

References Cited in the file of this patent
UNITED STATES PATENTS

| | | |
|---|---|---|
| 3,031,399 | Warnecke et al. | Apr. 24, 1962 |
| 3,036,963 | Christofilos | May 29, 1962 |